UNITED STATES PATENT OFFICE.

CLARENCE A. AXLINE, OF FULTONHAM, OHIO.

METHOD OF PRESERVATION OF FRUIT-JUICES.

SPECIFICATION forming part of Letters Patent No. 240,570, dated April 26, 1881.

Application filed December 27, 1880. (Specimens.)

*To all whom it may concern:*

Be it known that I, CLARENCE A. AXLINE, of Fultonham, in the county of Muskingum and State of Ohio, have invented certain new and useful Improvements in Preservation of Fruit-Juices; and I do hereby declare the following to be a full, clear, and exact description of the invention, such as will enable others skilled in the art to which it pertains to make and use it.

My invention relates to an improvement in preservation of fruit-juices; and it consists in boiling the juice of the grapes, skimming off the scum, filtering, while hot, through a compound of charcoal, crushed mustard-seed, and ground sassafras-root, and then boiling it again and bottling, as will be more fully described hereinafter.

The juice of the grapes is taken before fermentation takes place and boiled. All scum is carefully skimmed off, and then the liquid, while still hot, is filtered through a compound of partially-pulverized charcoal, crushed mustard-seed, and ground sassafras-root. The filter should be covered with fine woven wire, outside of which is fastened a flannel cloth to catch all escaping sediment. To every gallon of wine to be filtered there is placed in the filter two ounces of charcoal, two scruples of crushed mustard-seed, and six drams of ground sassafras-root. After the wine has been filtered it is again boiled, and if any scum or impurities appear on the surface they are removed, when the wine is to be bottled, corked tight, and should be left for one year.

Wine treated in this manner will keep unchanged for years, and will have a very pleasant sweet taste.

I am aware that the juice of various kinds of fruit has been boiled and then bottled for preservation, and this I disclaim.

Having thus described my invention, I claim—

The method described for preservation of fruit-juices, consisting in boiling the juice of the grape before fermentation has taken place, skimming off the scum, filtering through a compound composed of charcoal, crushed mustard-seed, and ground sassafras-root, then boiling the wine a second time and then bottling, substantially as described.

In testimony that I claim the foregoing I have hereunto set my hand this 21st day of December, 1880.

CLARENCE A. AXLINE.

Witnesses:
ADAM AXLINE,
CHARLES E. WELLER.